US008533835B2

(12) United States Patent
Likhachev et al.

(10) Patent No.: US 8,533,835 B2
(45) Date of Patent: Sep. 10, 2013

(54) METHOD AND SYSTEM FOR RAPID SIGNATURE SEARCH OVER ENCRYPTED CONTENT

(75) Inventors: Nikolay Vladimirovich Likhachev, Reston, VA (US); Alice Yali Chang, Alexandria, VA (US)

(73) Assignee: McAfee, Inc., Santa Clara, CA (US)

( * ) Notice: Subject to any disclaimer, the term of this patent is extended or adjusted under 35 U.S.C. 154(b) by 90 days.

(21) Appl. No.: 13/325,884

(22) Filed: Dec. 14, 2011

(65) Prior Publication Data

US 2013/0160125 A1 Jun. 20, 2013

(51) Int. Cl.
*G06F 7/04* (2006.01)
(52) U.S. Cl.
USPC ................ 726/24; 726/25; 726/26; 713/187; 713/188
(58) Field of Classification Search
USPC .......................................................... 726/24
See application file for complete search history.

(56) References Cited

U.S. PATENT DOCUMENTS

2010/0122088 A1* 5/2010 Oxford .......................... 713/168

OTHER PUBLICATIONS

U.S. Appl. No. 13/232,718; "System and Method for Statistical Analysis of Comparative Entropy"; pp. 43, Sep. 14, 2011.
U.S. Appl. No. 13/315,928; "Predictive Heap Overflow Protection"; pp. 52, Dec. 9, 2011.

* cited by examiner

*Primary Examiner* — Longbit Chai
(74) *Attorney, Agent, or Firm* — Baker Botts L.L.P.

(57) ABSTRACT

A method for detecting malware includes dividing data to be scanned for malware into at least a first data segment and a second data segment, dividing a signature corresponding to an indication of malware into at least a first signature segment and a second signature segment, performing a relationship function on the first signature segment and the second signature segment yielding a first result, performing the relationship function on the first data segment and the second data segment yielding a second result, comparing the first result and the second result, and, based on the comparison, determining that the data includes information corresponding to the signature. The relationship function characterizes the relationship between at least two information sets.

30 Claims, 5 Drawing Sheets

METHOD AND SYSTEM FOR RAPID SIGNATURE SEARCH OVER ENCRYPTED CONTENT

TECHNICAL FIELD OF THE INVENTION

The present invention relates generally to computer security and malware protection and, more particularly, to a method and system for rapid signature search over encrypted content.

BACKGROUND

Malware infections may be detected by comparing an identifier of a file under examination against an identifier of known malware. Antivirus applications may use such identifiers to match portions of suspected malware running on electronic devices. However, some malware may be encrypted using a cipher to disguise the true nature of the malware, and thus data comprising malware may not match any identifier for detecting the malware. When malware is newly encrypted, representing new permutations of existing malware, zero-day detection may not be possible.

Malware may include, but is not limited to, worms, spyware, rootkits, password stealers, spam, sources of phishing attacks, sources of denial-of-service-attacks, viruses, loggers, Trojans, adware, or any other digital content that produces unwanted activity.

SUMMARY

In one embodiment, a method for detecting malware includes dividing data to be scanned for malware into at least a first data segment and a second data segment, dividing a signature corresponding to an indication of malware into at least a first signature segment and a second signature segment, performing a relationship function on the first signature segment and the second signature segment yielding a first result, performing the relationship function on the first data segment and the second data segment yielding a second result, comparing the first result and the second result, and, based on the comparison, determining that the data includes information corresponding to the signature. The relationship function characterizes the relationship between at least two information sets.

In another embodiment, an article of manufacture includes a computer readable medium and computer-executable instructions carried on the computer readable medium. The instructions are readable by a processor. The instructions, when read and executed, cause the processor to divide data to be scanned for malware into at least a first data segment and a second data segment, divide a signature corresponding to an indication of malware into at least a first signature segment and a second signature segment, perform a relationship function on the first signature segment and the second signature segment yielding a first result, perform the relationship function on the first data segment and the second data segment yielding a second result, compare the first result and the second result, and, based on the comparison, determine that the data includes information corresponding to the signature. The relationship function characterizes the relationship between at least two information sets.

In yet another embodiment, a system for detecting malware includes a processor, a computer readable medium, and an anti-malware application configured to protect an electronic device from malware. The anti-malware application includes instructions carried on the computer readable medium. The instructions are readable by a processor. The instructions, when read and executed, cause the anti-malware application to divide data to be scanned for malware into at least a first data segment and a second data segment, divide a signature corresponding to an indication of malware into at least a first signature segment and a second signature segment, perform a relationship function on the first signature segment and the second signature segment yielding a first result, perform the relationship function on the first data segment and the second data segment yielding a second result, compare the first result and the second result, and, based on the comparison, determine that the data includes information corresponding to the signature. The relationship function characterizes the relationship between at least two information sets.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
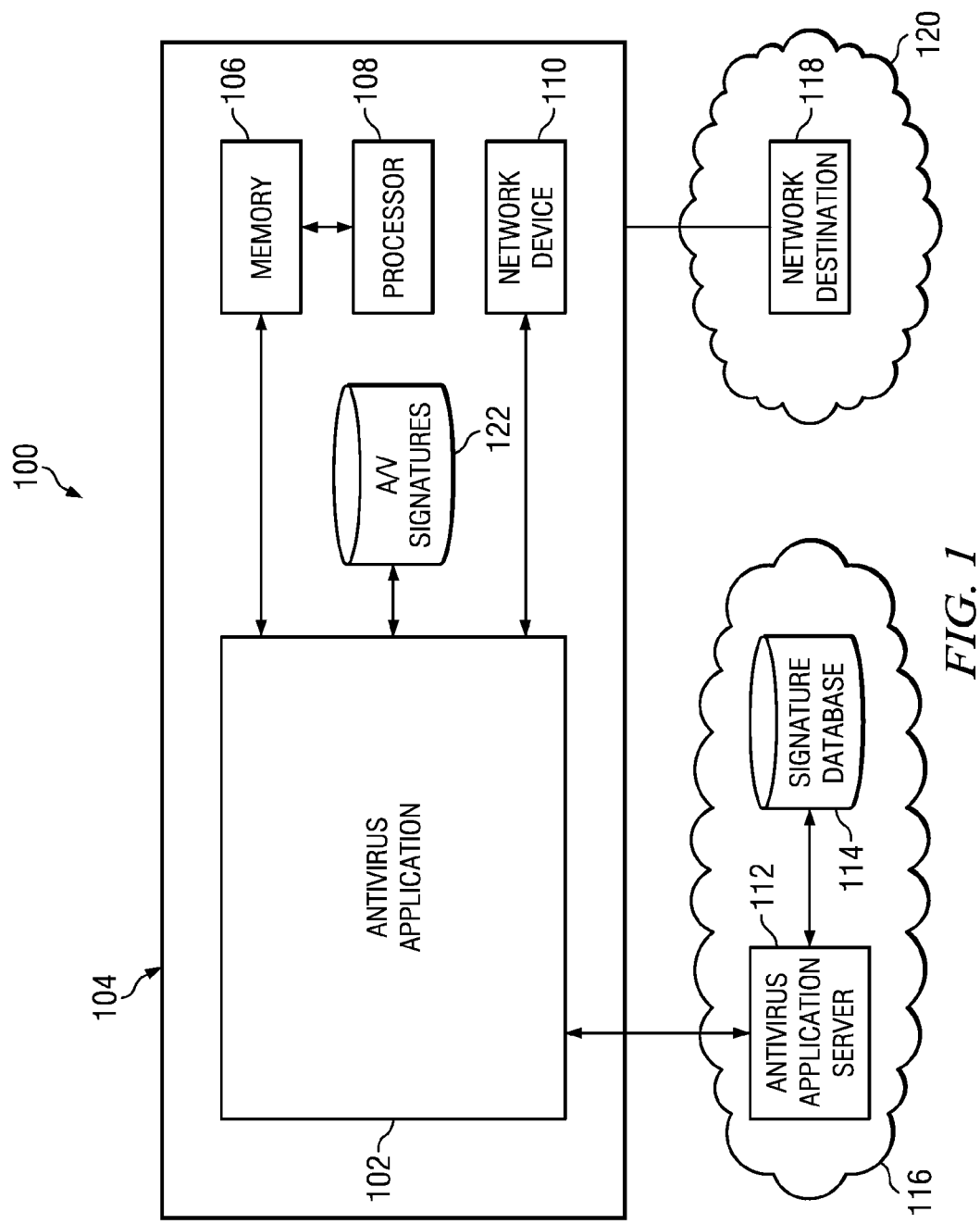
FIG. 1 is an illustration of an example system for rapid signature search over encrypted content.

FIG. 1 is an illustration of an example system 100 for rapid signature search over encrypted content. System 100 may comprise an antivirus application 102 running on a client 104. Antivirus application 102 may be configured to scan portions or all of client 104 for malware, or to scan communications to or from client 104. Antivirus application 102 may be configured to scan client 104 or its communications for encrypted content that may be have hidden malware. Antivirus application 102 may be configured to determine that encryption that has hidden malware and subsequently decrypt the content and scan for malware. Antivirus application 102 may be communicatively coupled to an antivirus application server 112 over a network 116 to receive updated information regarding malware. Antivirus application 102 may be communicatively coupled to server resources such as a signature database 114 to access information regarding malware, such as antivirus signatures 122.

In one embodiment, antivirus application 102 may be configured to scan data on client 104 by comparing the relationship between portions the data with the relationship between portions of antivirus signature. If the relationships between the data portions and the signature portions are the same or similar, then antivirus application 102 may be configured to determine that data contains encrypted information corresponding to signature that was used in the comparisons. Such determined data may include malware.

Client 104 may comprise an electronic device. Client 104 may comprise any device configurable to interpret and/or execute program instructions and/or process data, including but not limited to: a computer, desktop, server, laptop, personal data assistant, or smartphone. Client 104 may comprise a processor 108 coupled to a memory 106. Client 104 may comprise a network device 110 communicatively coupled with a network destination 118 over a network 120.

Processor 108 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 108 may interpret and/or execute program instructions and/or process data stored in memory 106. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable media).

Network device 110 may be configured to communicate with network destination 118. Network destination 118 may comprise, for example, a website, server, electronic device, network storage device. Network device 110 may comprise any suitable device for providing network communication between client 104 and network destination 118. Network device 110 may be configured to communicate with network destination 118 through any suitable network communications protocol, such as TCP/IP. Client 104 may be configured to receive or send information to network destination 118 through network device 110 in the form of data packets. Client 104 and network device 110 may be communicatively coupled to network destination 118 through network 120. Network 120 may be implemented in any way suitable for network destination 118 and client 104 to communicate with each other. Network 120 may comprise, for example, all or portions of a local area network, a wide area network, an intranet, or the Internet.

Antivirus application 102 may comprise any application, process, script, module, executable, server, executable object, library, or other suitable digital entity. Antivirus application 102 may be configured to reside in memory 106 for execution by processor 108 with instructions contained in memory 106. Antivirus application 102 may comprise an antivirus engine, operable to provide logic, rules, scripts, and/or instructions to antivirus application 102 to detect malware. Antivirus application 102 may comprise one or more antivirus signatures, each signature comprising a set of logic, rules, scripts, byte sequence, and/or instructions for detecting malware in a particular way. Each of the antivirus signatures may comprise file signatures, hashes, or any suitable mechanism to identify whether an entity or data of client 104 is malware.

Client 104 may contain antivirus signatures 122. Such signatures may represent identifiers of known malware. Antivirus signatures 122 may be implemented in, for example, a database, file, record, library, or other suitable entity. Antivirus signatures 122 may be communicatively coupled to antivirus application 102 and may be updated by antivirus application 102 or antivirus application server 112.

Antivirus application 102 may be configured to scan portions or all of client 104, or scan communications to or from client 104, for malware. In one embodiment, antivirus application 102 may be configured to scan client 104 or communications to or from 104 for content that is encrypted. In such an embodiment, application 102 may be configured to apply additional antivirus measures to encrypted content once it has determined that particular content is encrypted. Application 102 may be configured to determine the form of encryption that has been applied to the content. Application 102 may be configured to decrypt the content. Application 102 may be configured to scan decrypted content for malware or indications of malware. Application 102 may be configured to scan, for example, memory 106, packets of information to be transmitted by network device 110, or packets of information received by network device 110. If malware or indications of malware are determined to be present in the decrypted content, application 102 may be configured to take appropriate corrective action.

In one embodiment, antivirus application 102 may be configured to operate in a cloud-computing scheme. Antivirus application 102 may comprise software or instructions that resides on a network and may be loaded and executed on a machine on the network. In such an embodiment, antivirus application 102 may be communicatively coupled to client 104 through the network. Antivirus application 102 may scan client 104 without executing on client 104.

In another embodiment, antivirus application 102 may reside on client 104. Antivirus application 102 may be loaded and executed on client 104. In another embodiment, portions of antivirus application 102 may reside on client 104, and other portions of antivirus application 102 may reside on another machine communicatively coupled to client 104.

Antivirus application server 112 may be communicatively coupled to antivirus application 102 through network 116. Network 116 may be implemented in any way suitable for antivirus application server 112 and antivirus application 102 to communicate with each other. Network 116 may comprise, for example, all or portions of a local area network, a wide area network, an intranet, or the Internet. Antivirus application server 112 may be configured to communicate with application 102 through any suitable network communications protocol, such as TCP/IP.

Antivirus application server 112 may be configured to provide updates to antivirus application 102 and receive reports from antivirus application 102. In one embodiment, antivirus application server 112 may be configured to provide new or updated antivirus signatures to antivirus application 102. For example, upon detection of encrypted content not recognized as malware, application 102 may be configured to report the content and encryption method to antivirus application server 112 for further investigation. Antivirus application 102 may be configured to apply the signatures received to its scanning of client 104 by adding the signatures to antivirus signatures 122. Antivirus application server 112 may be configured to access information for updates by accessing signature database 114.

In operation, antivirus application 102 may scan client 104 for encrypted content that may be disguising or otherwise hiding malware or indications of malware. Antivirus application 102 may examine individual files, including but not limited to: executables, word processing documents, images, or spreadsheets. Machine code may have been maliciously inserted into non-executable files by malware at arbitrary locations through security vulnerabilities, such as buffer overflows. Such malicious machine code may reside anywhere within the file.

Infected files may reside within memory 106, may be received by client 104 through network device 110, or may be sent from client 104 to network destination 118 through network device 110. Malware may have used an encryption technique to disguise the presence of malicious machine code, or malicious data values, in data. Antivirus application 102 may detect the presence of malware through the presence of evidence that data has been encrypted, because antivirus application 102 may not have a signature corresponding to the encrypted malware.

Antivirus application 102 may search portions of memory 106 or data sent or received to or from network device 110 for data that has been encrypted by malware. Antivirus application 102 may search portions of memory 106 or data sent or receive by network device 110 by applying a mathematical operation to the data to be scanned, applying the same mathematical operation to a signature corresponding to malware, and then comparing the two results. In one example, the mathematical operation may comprise an encryption operation such as an exclusive-or ("XOR") operation. In another example, the mathematical operation may comprise an addition or subtraction. In yet another example, the operation may comprise a rotate right or rotate left with carry bit. The operation may include combinations of such examples.

In one embodiment, antivirus application 102 may search for data that has been encrypted using a particular operation such as an XOR operation. In such an embodiment, data may be encrypted using a key, which provide a comparison against which the values of the original data may be changed. In another embodiment, antivirus application 102 may search for data that has been encrypted by comparing the relationship between two signature portions and the relationship between two data portions. In such an embodiment, antivirus application 102 may determine whether the two relationships are the same and if so, determine that the data matches the signature. If the two relationships are similar then antivirus application 102 may conduct similar analysis for other portions of the signature or pass data to other anti-malware entities for further validation.

For example, an unencrypted bit sequence A: {10010110 11100111 11111111} may be encrypted by a key K: {11101010} by performing a bitwise XOR operation on each element of A with the corresponding element of K, repeating the application of K for each portion of A, as shown in the following manner:

| | |
|---|---|
| A: | 10010110 11100111 11111111 |
| K: | 11101010 11101010 11101010 |
| XOR (A, K): | 01111100 00001101 00010101 |

If A comprises an indication of malware, antivirus application 102 searching for such an indication using antivirus signatures 122 may not detect the indication because it has been encrypted by, for example, the XOR operation using the key K, or by another bit operation. Detection of encrypted content may require a signature by which antivirus application may detect a cipher contained within a file to be scanned, after which the content may be decoded. This may require prior knowledge of the signature specific to the cipher, which may be created by antivirus researchers and which antivirus application 102 may receive from antivirus application server 112. Such knowledge may be unavailable, as many keys or encryption functions may be used. The presence of malware inside of a non-executable file presents additional challenges. For example, while antivirus application 102 may be able to make use of a CPU emulator to execute the code the decrypt its contents, such a CPU emulator may require an entry point for execution. In addition, non-executable files may not contain an entry point.

Figure 2:
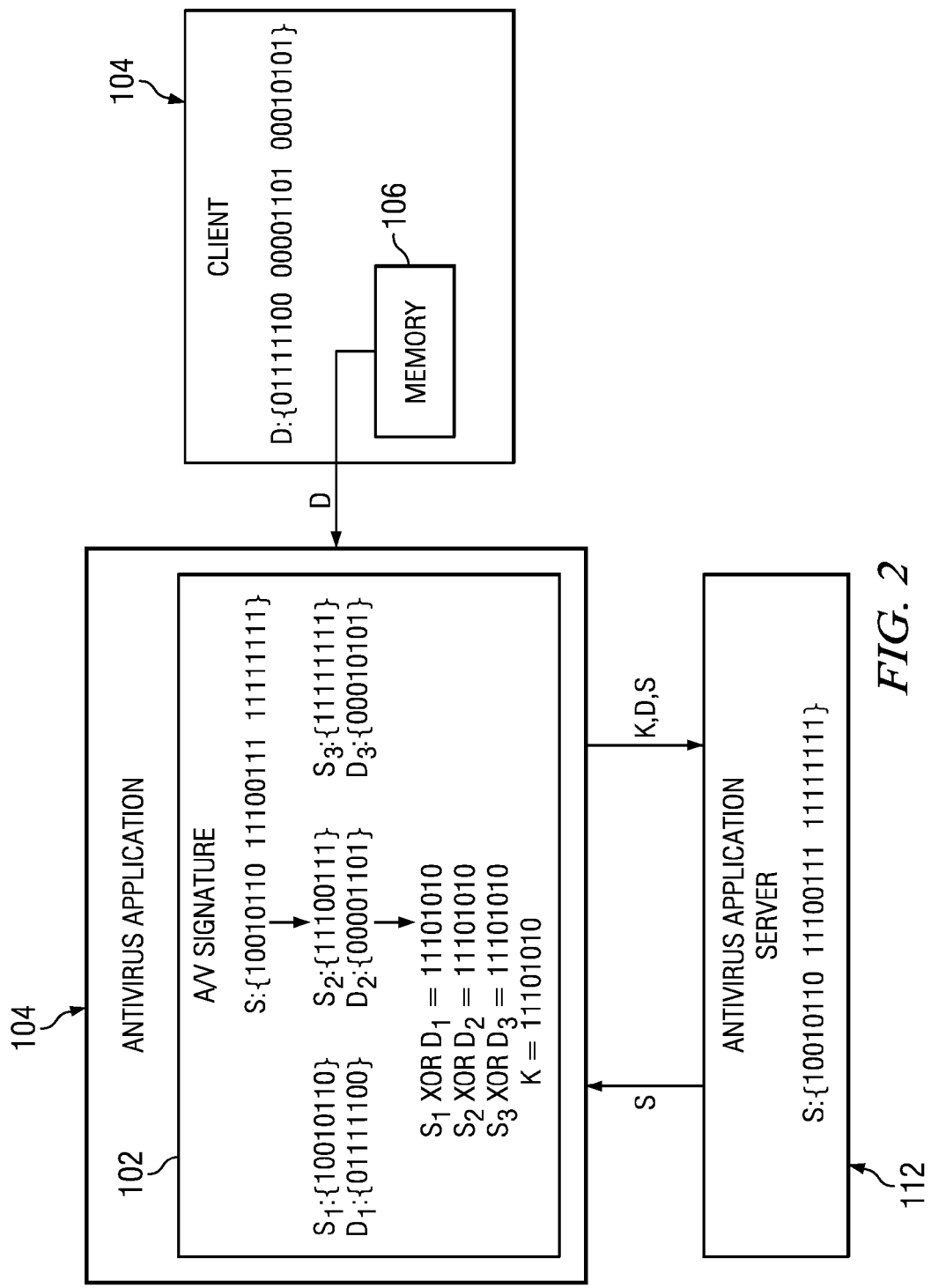
FIG. 2 is an illustration of an example embodiment of antivirus application searching for encrypted content.

FIG. 2 illustrates an example embodiment of antivirus application 102 searching for encrypted content. Antivirus application 102 may determine whether, for a given signature S, corresponding to a byte code sequence indicating malware, that a byte stream sample D comprises an encrypted version of the signature. Signature S may be stored in for example, antivirus signatures 122. Signature S may be one of many signatures that represent unencrypted byte code sequences known to be associated with malware, for which antivirus application 102 scans client 104. D may be taken from information in memory 106, or from data to be sent or received by network device 110. D may be one of many samples of code sequences taken from client 104 for which antivirus application 102 examines for indications of malware.

For example, byte stream sample D corresponding to the result from the previous example above may be given as D: {01111100 00001101 00010101} and may reside within a file in memory 106. An antivirus signature, comprising a pattern corresponding to a byte sequence associated with malware, may be given as S: {10010110 11100111 11111111} and may be accessible by antivirus application 102.

In such an example, antivirus application 102 scanning client 104 may encounter byte stream sample D, but would not match the signature S with D by a direct comparison. Thus, antivirus application 102 may not recognize byte stream sample D as malware in its encrypted form.

In one embodiment, antivirus application 102 may determine whether the byte stream sample D comprises the signature S encrypted with an XOR operation. As described below, antivirus application 102 may not be aware of the specific key possibly used to generate an encrypted byte stream from the original data. Antivirus application 102 may use any suitable method to determine whether the byte stream sample D comprises the signature S encrypted with an XOR operation. Antivirus application 102 may be able to detect the encryption of byte stream sample D without knowing the key K used to encrypt the original data. Antivirus application 102 may be able to detect the presence of malware encrypted into byte stream sample D without needing to use a signature matching the encrypted form of the malware, but with a signature S matching the original form of the malware. Such detections may enable antivirus application 102 to make "zero-day" detections, wherein new permutations of malware may be detected immediately upon first encounter. Such detections may not require malware researchers to first determine the new form of malware, create corresponding anti-virus signatures, and subsequently deploy the signatures to applications such as antivirus application 102. Antivirus application 102 may be able to determine the existence of a new form of malware at its initial contact with the new form of malware through scanning of client 104.

In such an embodiment, antivirus application 102 may divide signature S into separate parts and byte stream sample D into separate parts and subsequently apply an XOR operation between the corresponding parts of S and D using D as an encoding key for S and then comparing the results to each other. For example, antivirus application 102 may divide signature S into separate parts of equal lengths, $S_1$, $S_2$, and $S_3$. Antivirus application 102 may similarly divide byte stream sample D into equal lengths, $D_1$, $D_2$, and $D_3$. Antivirus application 102 may then apply an XOR function to $S_1$ and $D_1$, an XOR function to $S_2$ and $D_2$, and an XOR function to $S_3$ and $D_3$. Antivirus application 102 may compare the result of each XOR function. If the results are the same, then the sample byte stream D may have been encrypted using an XOR function. For example, S and D may be analyzed by:

| | $S_1$: 10010110 | $S_2$: 11100111 | $S_3$: 11111111 |
|---|---|---|---|
| | $D_1$: 01111100 | $D_2$: 00001101 | $D_3$: 00010101 |
| $S_1$ XOR $D_1$: | 11101010 | | |
| $S_2$ XOR $D_2$: | | 11101010 | |
| $S_3$ XOR $D_3$: | | | 11101010 |

In each of the three sets of $\{S_1, D_1\}$, $\{S_2, D_2\}$, and $\{S_3, D_3\}$, the result of the XOR operation is the same—11101010. Antivirus application 102 may thus determine that D is an encrypted byte stream.

In the above example, antivirus application 102 may divide S and D into one-byte segments and subsequently search for encrypted information. The key used to encrypt the data resulting in D was of one-byte length. However, antivirus application 102 may search for encrypted information for which a different-sized key was used to encrypt the information. In various embodiments, word lengths and dword lengths may be used for keys, signatures, and byte streams. Antivirus application 102 may determine a byte length B, for which it will search for encrypted information. In the above example, antivirus application 102 applied a search for a byte stream encrypted with a key of (B=1) by dividing S and D into segments of one byte-length each. However, antivirus application 102 may also search for byte streams encrypted with a key of longer or shorter lengths by dividing S and D into segments of longer or shorter lengths. For a given signature, the process of searching for encrypted byte streams may be repeated for more than one length. However, for the purposes of accuracy antivirus application 102 may search for signatures at least twice as long as the largest possible byte length. For example, antivirus application 102 may search for a signature having a size of four bytes by first dividing the signature and associated byte sequence samples into one-byte segments, and search again by dividing the signature and samples into two-byte segments.

If such methods do not determine that subsets of (D XOR S) match each other, antivirus application 102 may determine that D does not comprise a byte sequence corresponding to known malware has been that encrypted by an XOR function.

In such an embodiment, antivirus application 102 may determine whether the byte stream sample D comprises the signature S encrypted with an XOR operation by determining whether repeating patterns exist in the result of applying an XOR operation between D and S. For example, given the values of D and S in the previous example, application of an XOR operation to D and S yields the result:

| D: | {01111100 00001101 00010101} |
| S: | {10010110 11100111 11111111} |
| D XOR S: | {11101010 11101010 11101010} |

Antivirus application 102 may examine the result of (D XOR S) for a repeating pattern. Such a repeating pattern may be of a variable length. Antivirus application 102 may determine that any pattern repeating at least twice in the width of the signature S may be a repeating pattern corresponding to the XOR key K used to encode a byte stream corresponding to signature S.

If such methods do not determine that subsets of (D XOR S) match each other, antivirus application 102 may determine that D does not comprise a byte sequence corresponding to known malware that encrypted by an XOR function.

Such methods may enable antivirus application 102 to make a detection of malware present in D, despite not knowing the key K or a signature for the byte stream in its encrypted form. Such methods may be fast, requiring fewer execution operations than a brute force method of decrypting D. Such methods may be used with existing signatures accessible to antivirus application 102, without requiring the creation of additional signatures for every key found that might be used to encrypt indications of malware.

If antivirus application 102 does determine that D comprises a byte sequence corresponding to known malware encrypted by an XOR function, the antivirus application 102 may take additional steps. In one embodiment, the key K that was used to encrypt the data that ended in the resulting stream D may be found by antivirus application 102 determining the pattern repeating in the result of the XOR operation between D and S. Once the key K is known, the entire encrypted sequence may be decrypted and scanned using signature S or other antivirus signatures. Based upon the malware corresponding to the signature S, antivirus application 202 may take any suitable corrective action to remove, quarantine, or otherwise eliminate or neutralize the malware.

Antivirus application 102 may report the finding of malware in the byte stream D to antivirus server application 112, along with the key K that was used to encode the malware. Antivirus server application 112 may log the finding. A new signature may be created based upon the newly discovered encrypted form and subsequently deployed to other antivirus applications.

Figure 3:
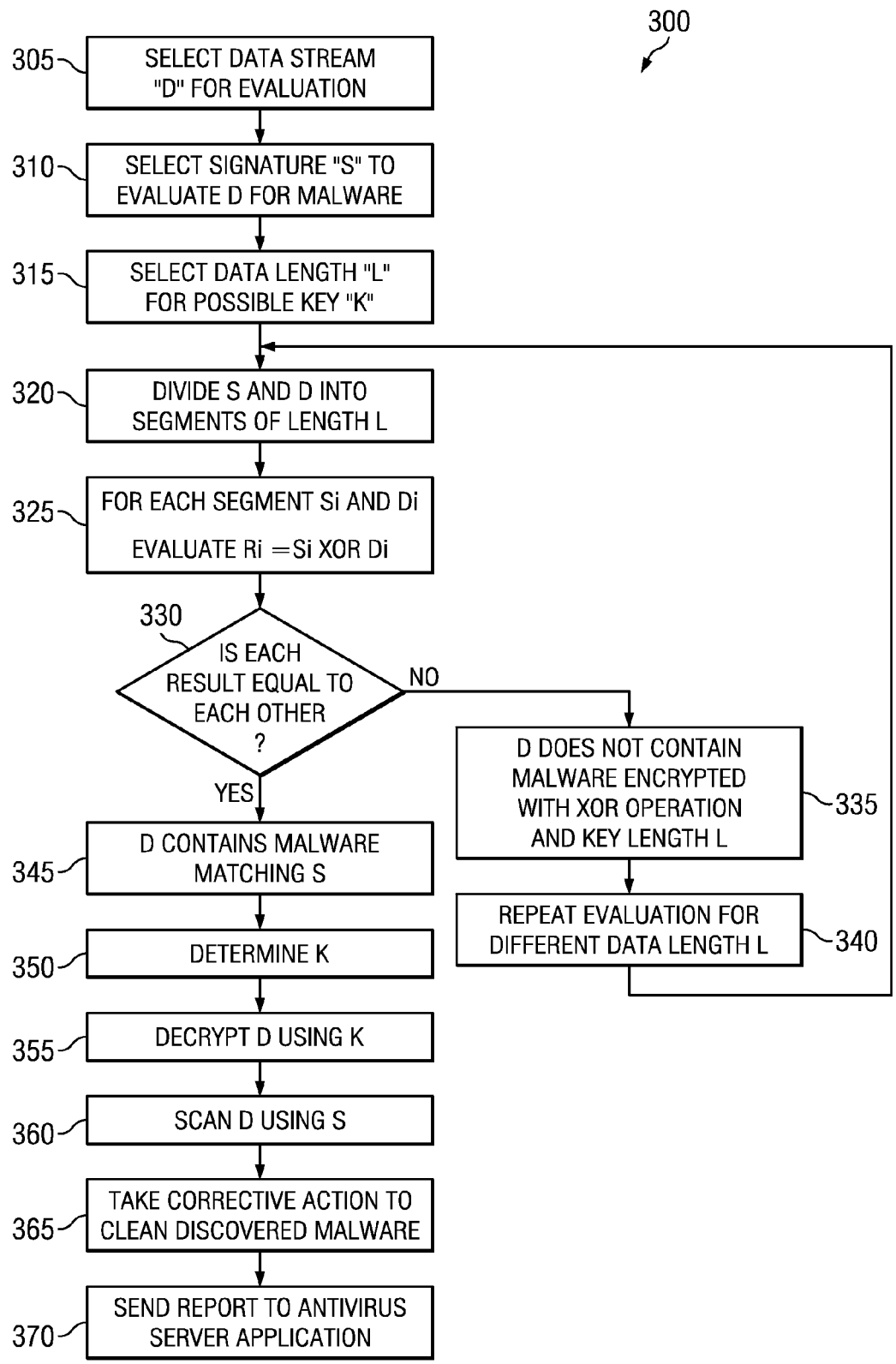
FIG. 3 is an illustration of an example embodiment of a method for rapid signature search through encrypted content.

FIG. 3 is an illustration of an example embodiment of a method 300 for rapid signature search over encrypted content. In step 305, a data stream D may be selected for evaluation of whether it contains encrypted malware. In step 310, a signature S corresponding to a known byte sequence of malware may be selected for which data stream D will be scanned. In step 315, a data length L of a possible key K may be selected. Key K may have been used to encrypt malware into data stream D. Data length L may be of a length equal or less than half of the size of signature S. In one embodiment, the data length L may be of a multiple of a byte, word, or dword. Key K may be the key by which malware was encrypted. In step 320, signature S and data stream D may be divided into one or more segments of length L, such as $\{S_1, S_2 \ldots\}$ and $\{D_1, D_2 \ldots\}$.

In step 325, an XOR operation may be applied to each of the corresponding segments of signature S and data stream D to obtain a result R. For example, $\{R_1 = S_1 \text{ XOR } D_1\}$. In step 330, it may be determined whether each result is equal to the others. If not, it may be determined in step 335 that the data stream does not comprise malware encrypted with an XOR operation having a key length L. In step 340, steps 320-330 may be repeated for a different data length L. A different data length L may be chosen according to the parameters as described above.

If so, in step 345 it may be determined that data stream D comprises encrypted malware matching signature S. In step 350, the key K used to encrypt the malware byte stream into data stream D may be determined. The key K may be the result of applying the XOR operations to a segment of signature S and data stream D. In step 355, the data stream D may be fully decrypted using key K. In step 360, the decrypted data stream D may be scanned using signature S, and/or other signatures. In step 365, corrective action may be taken on the file or memory location from which data stream D was taken. In one embodiment, the data stream may be removed from the file. In step 370, a report may be sent to an antivirus server application, including indications of the malware, file where found, type of file where found, and encryption key.

Figure 4:
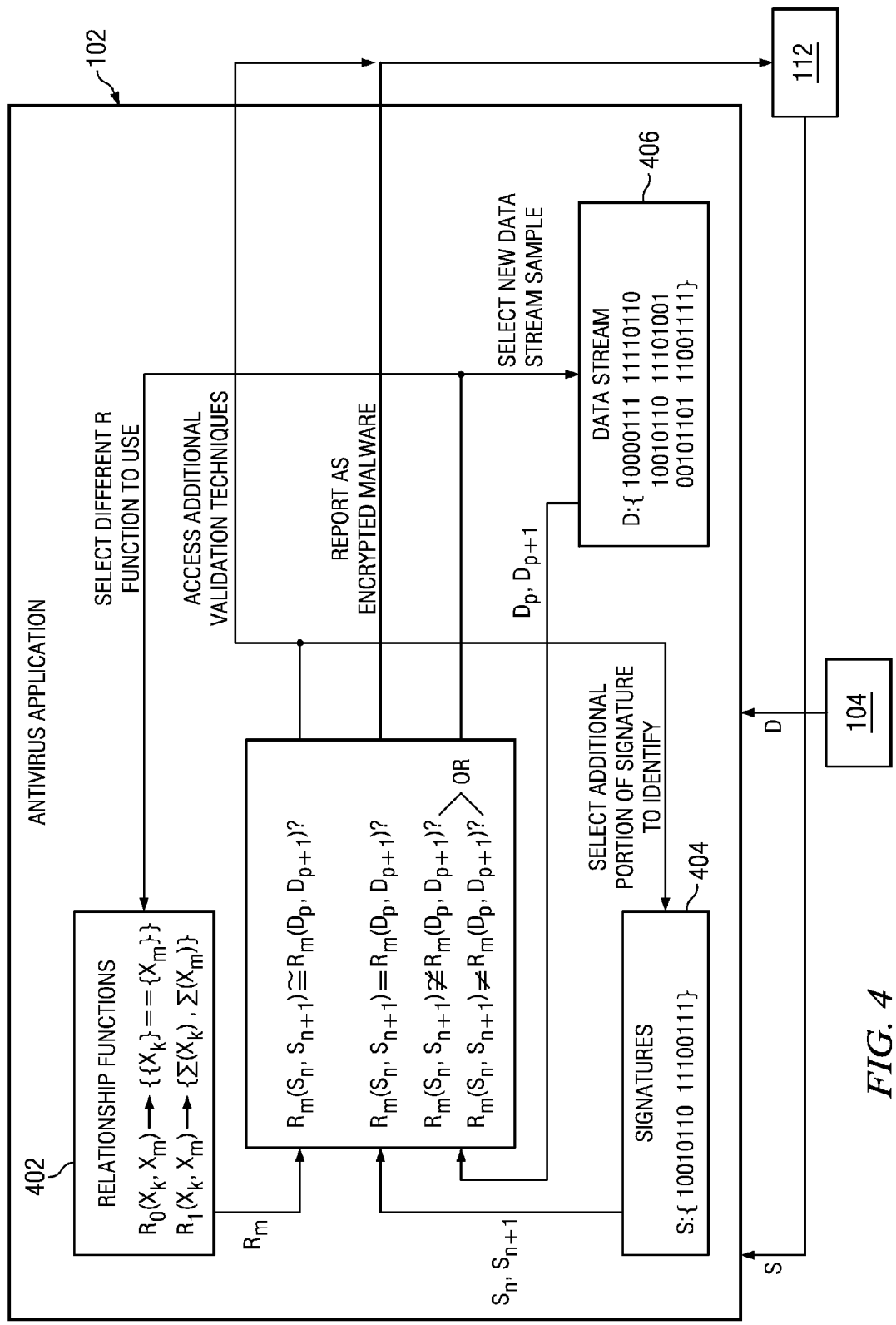
FIG. 4 is an illustration of an example embodiment of an antivirus application for rapid signature searching over encrypted content for malware using comparisons of relationship functions.

FIG. 4 is an illustration of an example embodiment of antivirus application 102 for rapid signature searching over encrypted content for malware using comparisons of relationship functions. Antivirus application 102 may be configured to determine the relationship between two portions of a signature, determine the relationship between two portions of a data stream being searched for encrypted malware, and compare the two relationships to determine whether the signature matches the data stream.

Although specific examples of relationship functions configured to find data encrypted by specific encryption methods are discussed herein, any suitable relationship function describing a relationship between two portions of a signature or data stream may be used. Further, any relationship function suitable to find a data encrypted by a given encryption method may be used.

Antivirus application 102 may contain or access one or more relationship functions 402 configured to characterize two elements of a data set. Such data sets may include, for example, portions of a signature or portions of data being searched. Relationship functions 402 may include any suitable function for defining the relationship between two portions of a data set. In one embodiment, the relationship between the data sets may include a comparison of the bit values between the data sets.

For example, relationship functions 402 may include $R_0$, which may define the relationship between two portions of a data set with an element-by-element Boolean equal determination. The operation of $R_0$ may be shown as $R_0(X_k, X_m) \rightarrow \{\{X_k\} == (X_m)\}$ where X is a set of data and $X_k$ and $X_m$ are subsets of X. In one embodiment, (m=k+1). The result of the function may be a set of Boolean indicators, which may be represented by ones and zeroes. Each element of $X_k$ may be compared to the corresponding element of $X_m$. If the two elements are the same, then the corresponding result element may be "true" or "1" representing that the elements in the set are the same. If the two elements are different, then the corresponding result element may be "false" or "0" representing that the elements in the set are different. Using simple data sets A={0, 0, 0, 0}, B={1, 1, 1, 1}, and C={1, 0, 1, 0}:

$R_0$(A, B)={0, 0, 0, 0} (all different)
$R_0$(A, C)={0, 1, 0, 1} (different, same, different, same)
$R_0$(B, C)={1, 0, 1, 0} (same, different, same, different)

In another example, relationship functions 402 may include $R_1$, which may define the relationship between two portions of a data set by respective counts of positive versus negative bits. $R_1$ may determine, for each portion, the number of positive bits or ones by summing the individual elements within the portion. The operation of $R_1$ may be shown as $R_0(X_k, X_m) \rightarrow (\Sigma(X_k, \Sigma(X_m))$ where X is a set of data and $X_k$ and $X_m$ are subsets of X. In one embodiment, (m=k+1). The result of the function may be a pair of integers representing the number of positive bits or ones in each respective portion.

Using simple data sets A={0, 0, 0, 0}, B={1, 1, 1, 1}, and C={1, 0, 1, 0}:

$R_1$(A, B)=(0, 4)
$R_1$(A, C)=(0, 2)
$R_1$(B, C)=(4, 2).

Antivirus application 102 may include signatures 404 which may be accessed from, for example, antivirus application server 112 or a local signature database. Signatures 404 may include values corresponding to malware, which, if matched to data being scanned, may indicate that the data is malicious. In the example of FIG. 4, signatures 404 may include the signature S: {10010110 11100111}. Signatures 404 may include one or more other signatures. Selection of the signature from signatures 404 may be made on the strength of a key represented by the signature. For example, weak keys may be selected.

Antivirus application 102 may include data stream 406. Data stream 406 may include portions of the data which antivirus application 102 is testing for encrypted malware. In the example of FIG. 4, data stream 406 may include the sampled data D: {10000111 11110110 10010110 11101001 00101101 11001111}. The first two subsets of data stream 406, {10000111 11110110} may be the encrypted result of applying an XOR function with a key of {0001} to signature S. The third and fourth subsets of data stream 406, {10010110 11101001}, may be the encrypted result of adding a key of {00000001} to signature S, then applying an XOR using the same key. The fifth and sixth subsets of data stream 406, {00101101 11001111}, may be the encrypted result of applying a rotate-left-with-carry function to signature S. Data stream 406 may be received from, for example, client 104.

Antivirus application 102 may be configured to compare two sections of a signature from signatures 404 against two sections of data from data stream 406. To make such a comparison, antivirus application 102 may be configured to apply one of relationship functions 402 to the set of two signature sections, apply the same relationship function to the set of two data sections, and compare the results of the two applications of the relationship function. Antivirus application 102 may be configured to determine whether the data matches the signature based on the comparison of the results.

In one embodiment, if the two results of applying the relationship function are the same, antivirus application 104 may be configured to determine that data stream 406 contains malware. Further, data stream 406 may contain encrypted malware and the malware, when unencrypted, may match the signature from signatures 404 used to make the comparison. Antivirus application 102 may be configured to communicate the malware determination to antivirus application server 112. Antivirus application 102 may be configured to clean, remove, block, or quarantine the malware from client 104, including data stream 406 and any processes, files, applications, or other entities associated with data stream 406.

In a further embodiment, antivirus application 104 may be configured to determine that the two results are the same if the two results contain the same repeating pattern, even though the two results may be offset from each other. For example, the two sets A={00010001} and B={01000100} may be considered the same because, given a repeat of the sets, they would contain the same pattern. A and B repeating may be shown as:

A repeating: 000100010001000100010001000100010001000
1000100010001

B repeating: 010001000100010001000100010001000100010
0010001000100

In another embodiment, if the two results of applying the relationship function are similar, antivirus application 104 may be configured to determine that data stream 406 may contain malware. Such a determination may comprise a fuzzy signature search. The similarity may be quantified by, for example, a percentage or absolute difference between the two results. To determine that the two results are sufficiently similar, antivirus application 104 may be configured to apply a threshold difference, above which the two results are considered sufficiently similar. Antivirus application 102 may be configured to make such fuzzy determinations where malware in data stream 406 may have been encrypted using methods that further obscure the underlying data.

For example, data stream 406 may have been encrypted using an XOR function with a key. In such an example, an application of $R_0$ to signature 404 and to encrypted data stream 406 (which would otherwise match the signature if not encrypted) may yield the exact same results. In another example, data stream 406 matching signature 404 may have been encrypted by first adding a key, then using an XOR function with the key. In such an example, an application of $R_0$ to signature 404 and to data stream 406 may yield results that are 80% similar. The specific similarity threshold may be determined by statistical analysis of known malware or known innocuous data.

In a further embodiment, if the results of applying relationship function 402 to the signature from signatures 404 and data stream 406 are similar but not exactly the same, antivirus application 102 may be configured to obtain another two portions of the signature from signatures 404 and repeat the comparison. Consequently, although the comparison results are only similar and not exact, subsequent determination that the relationship between another two portions of the signature from signatures 404 is similar to the relationship of portions of data stream 406 may provide additional evidence that data stream 406 includes malware matching the signature. If antivirus application 102 determines that every portion of the signature from signatures 404 results in at least a "similar" determination, then antivirus application 102 may determine that data stream 406 includes malware matching the signature from signatures 404.

In another further embodiment, if the results of applying relationship function 402 to the signature from signatures 404 and data stream 406 are similar but not exactly the same, antivirus application 102 may be configured to access additional antivirus or anti-malware resources to analyze data stream 406. Such additional resources may be more resource intensive than the rapid search conducted by antivirus application 102. However, usage of such intensive resources may be lessened by being used only upon a determination by antivirus application that the results of applying relationship function 402 to the signature from signatures 404 and data stream 406 are similar. The additional antivirus resources may include, for example, antivirus application server 116. Such resources may include intensive signature scanning, shell code analysis, reputation analysis, or any other suitable analysis. Antivirus application 102 may receive an indication from such resources of whether or not data stream 406 includes malware.

In yet another further embodiment, antivirus application 104 may be configured to determine that the two results are similar if the two results contain similar repeating patterns, even though the two results may be offset from each other. For example, the two sets C={00010001} and D={01100100} may be considered the same because, given a repeat of the sets, they would be within 12.5% of each other, with a different bit only once every eight bits. C and D repeating may be shown as:

C: 00010001000100010001000100010001000100010001
D: 01100100011001000110010001100100011001000110010001100100

In yet another embodiment, if the two results of applying the relationship function are not similar or equal, antivirus application 104 may be configured to determine that the examined portions of data stream 406 do not contain encrypted malware matching the malware signature used. Such a determination may be made if, for example, the similarity test described above has failed. Antivirus application 104 may be configured to apply the threshold difference, below which the two results may be considered not similar. If the two results of applying the relationship are not similar or equal, then a different portion of data stream 406 may be obtained to apply the function from relationship functions 402. If data stream 406 has been fully examined using the function from relationship functions 402, another function from relationship function may be selected.

In operation, antivirus application 102 may receive data stream 406 from client 104. Antivirus application 102 may search data stream 406 to determine whether data stream 406 matches a selected signature from signatures 404. Upon an unsuccessful search, a different signature may be selected from signatures 404 or a different function may be selected from relationship functions 402. The search may be repeated with the newly selected signature or function.

To search data stream 406, antivirus application 102 may apply a relationship function to two portions of the selected signature and to two portions of data stream 406. If the results of applying the relationship function to the two sets are equal, then antivirus application 102 may determine that malware corresponding to the selected signature has been found in data stream 406.

If the results of applying the relationship function to the two sets (two signature portions and two data stream portions) are similar, then antivirus application 102 may conduct additional analysis to determine whether malware corresponding to the selected signature has been found in data stream 406. Additional validation techniques for analyzing data stream 406 may be accessed in, for example, antivirus application server 112. The relationship function may be applied to another two portions of the selected signature. If antivirus application 102 determines that such application yields another similar result for all the portions of the selected signature, then antivirus application 102 may determine that malware corresponding to the selected signature has been found in data stream 406.

If the results of applying the relationship function to the two sets (two signature portions and two data stream portions) are neither similar nor equal, then antivirus application 102 may select two other portions of data stream 406 to analyze. Further, antivirus application 102 may select a different function from relationship functions 402 to apply to the two sets.

If encrypted malware is found in data stream 406, antivirus application 102 may clean, remove, quarantine, or block data stream 406 from client 104. Associated files, processes, applications, or other entities may be similarly handled. If no encrypted malware is found in data stream 406, antivirus application 102 may allow the access or execution of data stream 406 in client 104.

For example, using relationship functions $R_0$ or $R_1$, antivirus application 102 may be able to find data in data stream 406 based on signature S and encrypted with an XOR function.

Antivirus application 102 may select signature S from signatures 404. Antivirus application 102 may search data stream 406 for signature S. Antivirus application 102 may use relationship function $R_0$ to accomplish the search. Antivirus application 102 may select the first two portions of S and the first two portions of data stream 406 to use in the comparison. As described above, the first two portions of data stream 406 may include the signature S encrypted by use of an XOR function with a key of {0001}. Antivirus application 102 may determine that the relationship between the first two portions of S, using function $R_0(X_k, X_m) \to \{\{X_k\} = (X_m)\}$, may be:

$R_0(S_0, S_1) \to \{\{S_0\} == (S_1)\}$
$\to \{\{10010110\} == (11100111)\}$
$\to \{(1 = 1?), (0 = 1?), (0 = 1?), (1 = 0?), (0 = 0?), (1 = 1?),$
$(1 = 1?), (0 = 1?)\}$
$\to \{1, 0, 0, 0, 1, 1, 1, 0\}$

Antivirus application 102 may determine that the relationship between the first two portions of D (from data stream 406), using the same relationship function, may be:

$R_0(D_0, D_1) \to \{\{D_0\} == (D_1)\}$
$\to \{\{10000111\} == (11110110)\}$
$\to \{(1 = 1?), (0 = 1?), (0 = 1?), (0 = 1?), (0 = 0?), (1 = 1?),$
$(1 = 1?), (1 = 0?)\}$
$\to \{1, 0, 0, 0, 1, 1, 1, 0\}$

Antivirus application 102 may determine that the results of applying the relationship function $R_0$ to the first two portions of the signature S may equal the results of applying the relationship function $R_0$ to the first two portions of data stream 406. The common result may be {1, 0, 0, 0, 1, 1, 1, 0}:

$R_0(S_0, S_1)$==$R_0(D_0, D_1)$
{1,0,0,0,1,1,1,0}={1,0,0,0,1,1,1,0}?
→True

Consequently, it may be determined that data stream 406 includes encrypted malware corresponding to signature S. The portions of data stream 406 indicating such encrypted malware may include the first two portions of data stream 406. Thus, antivirus application 102 may be able to discover malware encrypted by use of an XOR function by applying the relationship function $R_0$.

Antivirus application 102 may conduct the search of the first two portions of data stream 406 for signature S, but using relationship function $R_1$ to accomplish the search. Antivirus application 102 may determine that the relationship between the first two portions of S, using function $R_1(X_k, X_m) \to (\Sigma(X_k), \Sigma(X_m))$ may be:

$$R_1(S_0, S_1) \to (\Sigma(S_0), \Sigma(S_1))$$
$$\to \{\Sigma\{10010110\}, \Sigma(11100111)\}$$
$$\to \{4, 6\}$$

Antivirus application 102 may determine that the relationship between the first two portions of D (from data stream 406), using the same relationship function $R_1$, may be:

$$R_1(D_0, D_1) \to (\Sigma(D_0), \Sigma(D_1))$$
$$\to \{\Sigma\{10010110\}, \Sigma(11100111)\}$$
$$\to \{4, 6\}$$

Consequently, antivirus application 102 may determine that the results of applying the relationship function $R_1$ to the first two portions of the signature S may equal the results of applying the relationship function $R_1$ to the first two portions of data stream 406. The common result may be (4, 6):

$R_1(S_0, S_1)$==$R_1(D_0, D_1)$
{4, 6}={4, 6}?
→True

Thus, it may be determined that data stream 406 includes encrypted malware corresponding to signature S. The portions of data stream 406 indicating such encrypted malware may include the first two portions of data stream 406. Thus, antivirus application 102 may be able to discover malware encrypted by use of an XOR function by applying the relationship function $R_1$.

In another example, antivirus application 102 may be able to find data in data stream 406 based on signature S and encrypted. The encryption may have been accomplished by adding a key to data and then applying an XOR function with the same key to the result. Antivirus application 102 may fail to find the corresponding data in data stream 406 using relationship function $R_0$, but may repeat the search using relationship $R_1$ to determine that the encrypted data is present.

Antivirus application 102 may search data stream 406 for signature S using relationship function $R_0$ to accomplish the search. Antivirus application 102 may select the first two portions of S and the third and fourth portions of data stream 406 to use in the comparison. As described above, the third and fourth portions of data stream 406 may include the signature S encrypted by rotating the source data left and carrying the extra bit. As previously shown, antivirus application 102 may determine that the relationship between the first two portions of S, using function $R_0(X_k, X_m) \to \{\{X_k\} == (X_m)\}$, may be:

$$R_0(S_0, S_1) \to \{\{S_0\} == (S_1)\}$$
$$\to \{\{10010110\} == (11100111)\}$$
$$\to \{(1=1?), (0=1?), (0=1?), (1=0?), (0=0?), (1=1?),$$
$$(1=1?), (0=1?)\}$$
$$\to \{1, 0, 0, 0, 1, 1, 1, 0\}$$

Antivirus application 102 may determine that the relationship between the third and fourth portions of D (from data stream 406), using the same relationship function, may be:

$$R_0(D_2, D_3) \to \{\{D_2\} == (D_3)\}$$
$$\to \{\{10010110\} == \{11101001\}\}$$
$$\to \{(1=1?), (0=1?), (0=1?), (1=0?), (0=1?), (1=0?),$$
$$(1=0?), (0=1?)\}$$
$$\to \{1, 0, 0, 0, 0, 0, 0, 0\}$$

Antivirus application 102 may determine that the results of applying the relationship function $R_0$ to the first two portions of the signature S are not similar to the results of applying the relationship function $R_0$ to the third and fourth portions of data stream 406:

$R_0(S_0, S_1)$==$R_0(D_2, D_3)$
{1, 0, 0, 0, 1, 1, 1, 0}≈{1, 0, 0, 0, 0, 0, 0, 0}?
→False The results may be 62.5% similar. Such a difference may not meet a minimum threshold of, for example, 80% similarity to be considered similar for the purposes of searching for encrypted code. Consequently, it may be determined that the examined portion of data stream 406 does not include encrypted malware corresponding to signature S, based on use of relationship function $R_0$. Thus, antivirus application 102 may be not able to discover malware—encrypted by adding a key to data and subsequently applying an XOR function with the same key—by applying the relationship function $R_0$.

If antivirus application 102 fails to detect malware in data stream 406 in $D_2$, $D_3$ using relationship function $R_0$, antivirus application 102 run the same search on different portions of data stream 406. For example, antivirus application 102 may run the same search for S on $D_0$ and $D_1$, as illustrated in the first example. In another example, antivirus application 102 may rerun the search for S on data stream 406 in $D_2$, $D_3$, but using relationship function $R_1$ to accomplish the search.

As shown above, antivirus application 102 may determine that the relationship between the first two portions of S, using function $R_1(X_k, X_m) \to (\Sigma(X_k), \Sigma(X_m))$ may be:

$$R_1(S_0, S_1) \to (\Sigma(S_0), \Sigma(S_1))$$
$$\to \{\Sigma\{10010110\}, \Sigma(11100111)\}$$
$$\to \{4, 6\}$$

Antivirus application 102 may determine that the relationship between the third and fourth portions of D (from data stream 406), using the same relationship function $R_1$, may be:

$$R_1(D_2, D_3) \to (\Sigma(D_2), \Sigma(D_3))$$
$$\to \{\Sigma\{10010110\}, \Sigma(11101001)\}$$
$$\to \{4, 5\}$$

Consequently, antivirus application 102 may determine that the results of applying the relationship function $R_1$ to signature S may be similar to the results of applying the relationship function $R_1$ to the third and fourth portions of data stream 406:

$R_1(S_0, S_1) = R_1(D_2, D_3)$
$\{4, 6\} \approx \{4, 5\}$?
→True

The two results may be 92.55% similar. Compared to a sample similarity threshold of, for example, 80%, antivirus application 102 may determine that the results are sufficiently similar. Thus, it may be determined that data stream 406 may include encrypted malware corresponding to signature S. Other portions of S, if available, may be compared to data stream 406 using the relationship function $R_1$. Data stream 406 may be sent to antivirus application server 112 or another entity for further analysis. Thus, antivirus application 102 may be able to discover malware encrypted by use of adding a key to data, then applying an XOR function with the key, by applying the relationship function $R_1$.

In yet another example, antivirus application 102 may be able to find data in data stream 406 based on signature S and encrypted by rotating the data left, using a carry bit. Antivirus application 102 may be able to find the corresponding encrypted data in data stream 406 using relationship function $R_0$—by evaluating repeating patterns in the two results—or by using relationship function $R_1$.

Antivirus application 102 may search data stream 406 for signature S using relationship function $R_0$ to accomplish the search. Antivirus application 102 may select the first two portions of S and the fifth and sixth portions of data stream 406 to use in the comparison. As described above, the fifth and sixth portions of data stream 406 may include the signature S encrypted by first adding the key $\{00000001\}$ and then applying an XOR function with the same key to the result. As previously shown, antivirus application 102 may determine that the relationship between the first two portions of S, using function $R_0(X_k, X_m) \to \{\{X_k\} = (X_m)\}$, may be:

$R_0(S_0, S_1) \to \{\{S_0\} == (S_1)\}$
$\to \{\{10010110\} == (11100111)\}$
$\to \{(1 = 1?), (0 = 1?), (0 = 1?), (1 = 0?), (0 = 0?), (1 = 1?),$
$(1 = 1?), (0 = 1?)\}$
$\to \{1, 0, 0, 0, 1, 1, 1, 0\}$

Antivirus application 102 may determine that the relationship between the fifth and sixth portions of D (from data stream 406), using the same relationship function, may be:

$R_0(D_4, D_5) \to \{\{D_4\} == (D_5)\}$
$\to \{\{00101101\} == (11001111)\}$
$\to \{(0 = 1?), (0 = 1?), (1 = 0?), (0 = 0?), (1 = 1?), (1 = 1?),$
$(0 = 1?), (1 = 1?)\}$
$\to \{0, 0, 0, 1, 1, 1, 0, 1\}$

Based on an element-by-element comparison, antivirus application 102 may determine that the results of applying the relationship function $R_0$ to the first two portions of the signature S are not similar to the results of applying the relationship function $R_0$ to the fifth and sixth portions of data stream 406:

$R_0(S_0, S_1) = R_0(D_4, D_5)$
$\{1, 0, 0, 0, 1, 1, 1, 0\} \approx \{0, 0, 0, 1, 1, 1, 0, 1\}$?
→False The results may be 50% similar, less than an example minimum threshold of 80% similarity to be considered similar for the purposes of searching for encrypted code.

However, antivirus application 102 may compare these results in terms of similarity between their repeating patterns. The result of applying the relationship function $R_0$ to the signature and the result of applying the relationship function $R_0$ to the data may be expressed as the repeating patterns:

$R_0(S_0, S_1)$: 1, 0, 0, 0, 1, 1, 1, 0, 1, 0, 0, 0, 1, 1, 1, 0, 1, 0, 0, 0, 1, 1, 1, 0

$R_0(D_4, D_5)$: 0, 0, 0, 1, 1, 1, 0, 1, 0, 0, 0, 1, 1, 1, 0, 1, 0, 0, 0, 1, 1, 1, 0, 1

Antivirus application 102 may be configured to detect each of the repeating patterns and compare them. The resulting repeating patterns may be equal. Consequently, it may be determined that the examined portion of data stream 406 includes encrypted malware corresponding to signature S, based on use of relationship function $R_0$. Thus, antivirus application 102 may be able to discover malware—encrypted by rotating data to the left and using a carry bit—by applying the relationship function $R_0$.

Antivirus application 102 run the search for S on data stream 406 in $D_2$, $D_3$, but using relationship function $R_1$ to accomplish the search. Such a search may not require comparisons of repeating patterns.

As shown above, antivirus application 102 may determine that the relationship between the first two portions of S, using function $R_1(X_k, X_m) \to (\Sigma(X_k), \Sigma(X_m))$ may be:

$R_1(S_0, S_1) \to (\Sigma(S_0), \Sigma(S_1))$
$\to \{\Sigma\{10010110\}, \Sigma(11100111)\}$
$\to \{4, 6\}$ Antivirus application 102 may determine that the relationship between the fifth and sixth portions of D (from data stream 406), using the same relationship function $R_1$, may be:

$R_1(D_4, D_5) \to (\Sigma(D_4), \Sigma(D_5))$
$\to \{\Sigma\{00101101\}, \Sigma(11001111)\}$
$\to \{4, 6\}$ Consequently, antivirus application 102 may determine that the results of applying the relationship function $R_1$ to signature S may be equal to the results of applying the relationship function $R_1$ to the fourth and fifth portions of data stream 406. The common result may be (4, 6):

$R_1(S_0, S_1) = R_1(D_0, D_1)$
$\{4, 6\} = \{4, 6\}$?
→True

Thus, it may be determined that data stream 406 includes encrypted malware corresponding to signature S. The portions of data stream 406 indicating such encrypted malware may include the fifth and sixth portions of data stream 406. Antivirus application 102 may thus be able to discover malware encrypted by use of a rotate left with carry bit function by applying the relationship function $R_1$.

Table 1 is a summary of the generation of encrypted data D based on the signature S, calculations of the relationship functions $R_0$ and $R_1$ for portions of D and S, and comparisons of the results from such calculations. Such information may be the result of the operation of FIG. 4 and is described in greater detail above.

TABLE 1

Starting Signature

S = {10010110   11100111}            [Starting signature]
      $S_0$          $S_1$ Signature encrypted using different techniques S XOR {00010001} = {10000111   11110110}
                     $D_0$        $D_1$
S + {00000001} XOR {00000001} =  = {10010110   11101001}
                                    $D_2$        $D_3$
LEFT(S)                          = {00101101   11001111}
                                    $D_4$        $D_5$ Application of relationship functions to Signature and encrypted data

| | |
|---|---|
| $R_0(S_0, S_1) = \{10001110\}$ | $R_1(S_0, S_1) = (4,6)$ |
| $R_0(D_0, D_1) = \{10001110\}$ | $R_1(D_0, D_1) = (4,6)$ |
| $R_0(D_2, D_3) = \{10000000\}$ | $R_1(D_2, D_3) = (4,5)$ |
| $R_0(D_4, D_5) = \{00011101\}$ | $R_1(D_4, D_5) = (4,6)$ |

Comparisons of relationship function results

| | |
|---|---|
| $R_0(S_0, S_1) = R_0(D_0, D_1)$ ? | |
| {10001110} = {10001110} | Result: Match |
| $R_0(S_0, S_1) = R_0(D_2, D_3)$ ? | |
| {10001110} ≠ {10000000} | Result: No match, 62.5% similarity |
| $R_0(S_0, S_1) = R_0(D_4, D_5)$ ? | |
| {10001110} = {00011101}? | |
| {10001110} | |
| {00011101} | Result: Match |
| $R_1(S_0, S_1) = R_1(D_0, D_1)$ ? | |
| (4,6) = (4,6) | Result: Match |
| $R_1(S_0, S_1) = R_1(D_2, D_3)$ ? | |
| (4,6) ≈ (4,5) | Result: Match, 91.5% similarity |
| $R_1(S_0, S_1) = R_1(D_4, D_5)$ ? | |
| (4,6) = (4,6) | Result: Match |

Figure 5:
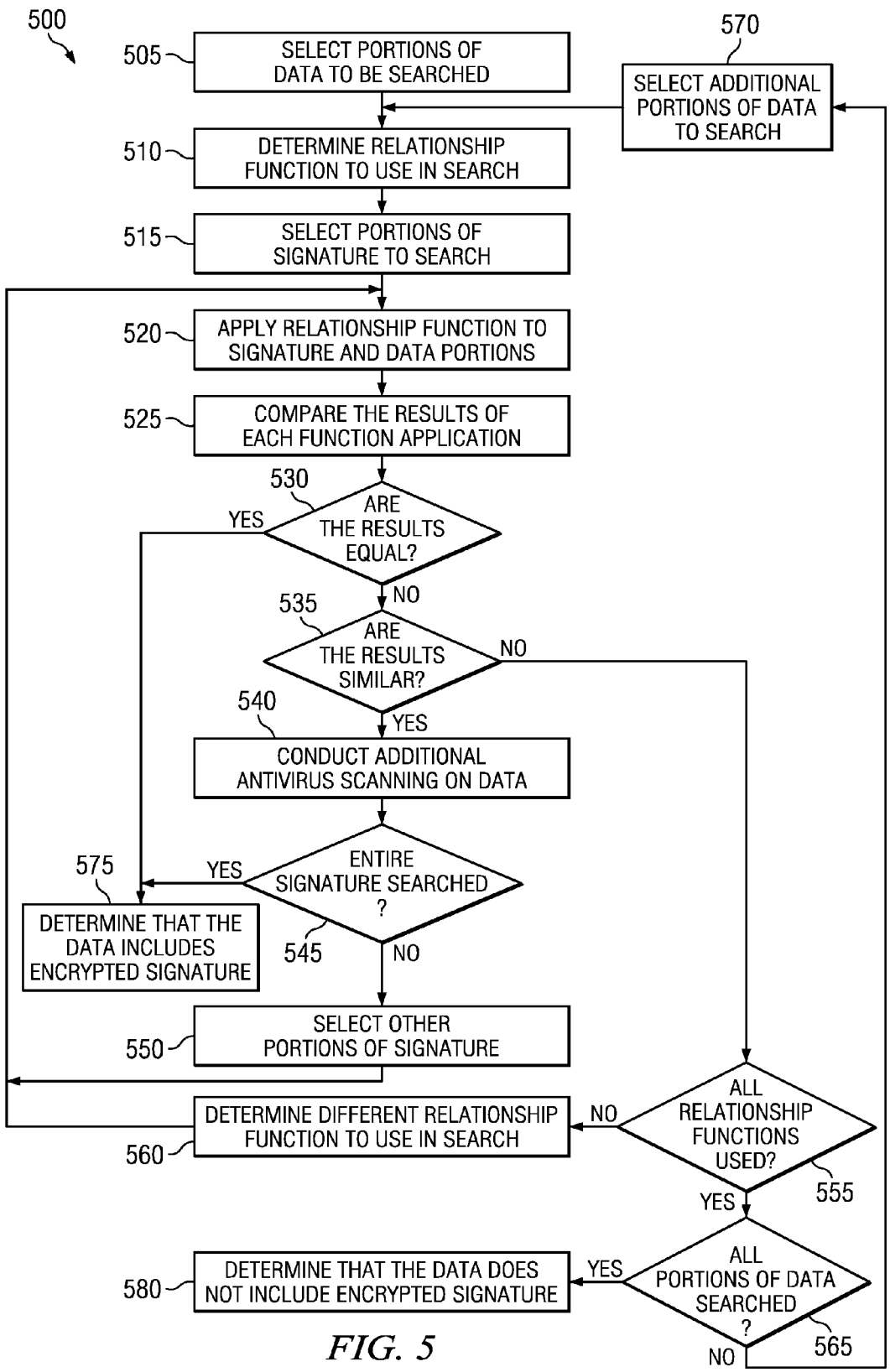
FIG. 5 is an illustration of an example method for rapid signature searching over encrypted content for malware using comparisons of relationship functions

FIG. 5 is an illustration of an example method 500 for rapid signature searching over encrypted content for malware using comparisons of relationship functions.

In step 505, portions of data to be searched may be selected. Such data may include untrusted or unverified data that may contain malware. The data may have been received on an electronic device from a network destination. Such malware may be disguised from typical signature-based antivirus detection by encrypting its contents. Such encryption may be accomplished by, for example, logical functions such as AND, OR, or XOR using a key, rotate left or rotate right functions, functions such as adding or subtracting a key, or a combination of any such function.

In step 510, a relationship function to be used in the search may be determined. Any suitable relationship function may be used. In one embodiment, a relationship function characterizing the relationship between the bits in two or more information sets may be used. The information sets may include two portions of the same entity such as a signature or data being scanned for malware. The information sets may be adjacent or disparate. Example relationship functions may include but are not limited to functions determining the number of bits with a "one" value in a first set compared to the number of bits with a "one" value in a second set; or functions determining the element-by-element differences between first set and the second set.

In step 515, portions of a signature to be used in the search may be selected. The signature may correspond to an unencrypted hash or digital signature of malware. Weak keys may be selected as the portions of the signature to be used in the search. Method 500 will use the relationship function to search for evidence that the data is encrypted to avoid matching the signature. If such evidence is found, then the data may be determined to be malicious.

In step 520, the selected relationship function may be applied to both the selected signature portions and the selected data portions. In one embodiment, the selected relationship function may be applied to two such portions of each. In step 525, the results of the two applications of the relationship function may be compared. The results may be compared in any suitable manner. For example, the results may be analyzed to determine whether the results are equal to each other, similar to each other, not similar to each other, or contain the same repeating pattern.

In step 530, it may be determined whether the results are equal. Such equality may be determined in any suitable manner. In one embodiment, each element in each of the results may be compared against the correspond element in the other result. In another embodiment, the results may be analyzed to determine whether the results contain the same repeating pattern. If so, then it may be determined that the results are equal.

If the results are equal, then method 500 may proceed to step 575. If the results are not equal, then in step 535 it may be determined whether the results are similar. Any suitable mechanism may be used to determine whether the results are similar. For example, the differences between the results may be compared against a threshold. In one embodiment, the similarity between the results may be calculated. The similarity may be measured in, for example, absolute differences or percentage differences. A similarity threshold may be applied to determine whether the results are sufficiently similar. In a further embodiment, such a threshold may be 80%.

If the results are not similar, then the method 500 may proceed to step 555. If the results are similar, then in step 540 additional antivirus scanning on the data may be conducted. The data may be sent to, for example, an antivirus server for such analysis. The additional antivirus scanning may be resource intensive. Method 500 may gate the use of such resource intensive scanning by applying it upon the determination that the results are similar, indicating a chance that the data may contain malware.

In step 545, it may be determined whether the entire signature has been used in the search. If not, in step 550 other portions of the signature may be selected and the comparison against the searched data may be repeated. Method 500 may return to step 520 to repeat such steps. If the entire signature has been used, then the method 500 may proceed to step 575.

In step 555, wherein it may have been determined that the results were not similar, it may be determined whether all possible relationship functions have been used. If not, then in step 560 a different relationship function may be determined to be used in the search. Method 500 may return to step 520 to repeat the search with the different relationship function.

If all possible relationship functions have been used, then in step 565 it may be determined whether all portions of the data have been searched. If not, then in step 570 additional portions of the data to be searched may be determined. Method 500 may return to step 510 to repeat the search. If all portions of the data have been searched, then the method 500 may proceed to step 580.

In step 575, it may be determined that the data includes an encrypted signature corresponding to the signature used in the search. Such an encrypted signature may be an indication that data contains malware. The data and associated entities may be cleaned or blocked from the electronic device. The determination that the data includes an encrypted signature may be based on the similarities in applying a relationship function to the known signature and to the data being searched.

In step 580, it may be determined that the data does not include an encrypted signature corresponding to the signature used in the search. Method 500 may be repeated with a different signature. If no other signatures exist with which to repeat method 500, then it may be determined that the data does not contain known malware. The determination that the data does not include an encrypted signature may be based on the lack of similarity between applying a relationship function to the known signature and to the data being searched.

Methods 300 and 500 may be implemented using the system of FIGS. 1-2 and 4-5, or any other system operable to implement methods 300 and 500. As such, the preferred initialization point for methods 300 and 500 and the order of the steps comprising method methods 300 and 500 may depend on the implementation chosen. In some embodiments, some steps may be optionally omitted, repeated, or combined. In certain embodiments, methods 300 and 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method for detecting malware, comprising:
dividing a portion of data of an electronic device to be scanned for malware into at least a first data segment and a second data segment;
dividing a signature corresponding to an indication of malware into at least a first signature segment and a second signature segment, wherein said signature is not identical to the portion of data;
performing, by a processor, a mathematical relationship function on the first signature segment and the second signature segment, yielding a first result, the relationship function characterizing the relationship between at least two information sets;
performing said relationship function on the first data segment and the second data segment, yielding a second result;
comparing the first result and the second result;
based on the comparison, determining that the portion of data of the electronic device includes information corresponding to said signature so as to perform a search of said first two segments of the portion of data for said signature by using said relationship function for the detection of malware.

2. The method of claim 1, wherein the relationship function includes a determination of the number of positive bits in each information set.

3. The method of claim 1, wherein the relationship function includes an element-by-element comparison of whether the elements in a first information set are equal to the corresponding element in a second information set.

4. The method of claim 1, further comprising determining that the data includes malware identified by the signature.

5. The method of claim 1, wherein comparing the first result and the second result includes determining whether the similarity between the first result and the second result exceeds a similarity threshold.

6. The method of claim 5, further comprising:
selecting a third signature segment and a fourth signature segment;
performing the relationship function on the third signature segment and the fourth signature segment, yielding a third result; and
comparing the third result and the second result.

7. The method of claim 1, wherein comparing the first result and the second result includes determining whether the first result and the second result are equal.

8. The method of claim 1, wherein comparing the first result and the second result includes determining whether the first result and the second result contain one or more repeating patterns in common.

9. The method of claim 1, wherein comparing the first result and the second result includes determining whether the similarity between the first result and the second result exceeds a similarity threshold, and further comprising:
selecting a third data segment and a fourth data segment;
performing the relationship function on the third data segment and the fourth data segment, yielding a third result; and
comparing the third result and the first result.

10. The method of claim 1 wherein comparing the first result and the second result includes determining whether the similarity between the first result and the second result exceeds a similarity threshold; and
further comprising performing additional anti-malware processing on the portion of data based on the determining whether the similarity exceeds the similarity threshold.

11. The article of claim 10, wherein comparing the first result and the second result includes determining whether the first result and the second result are equal.

12. The article of claim 10, wherein comparing the first result and the second result includes determining whether the first result and the second result contain one or more repeating patterns in common.

13. The article of claim 10, wherein:
comparing the first result and the second result includes determining whether the similarity between the first result and the second result exceeds a similarity threshold; and
the processor is further caused to:
select a third data segment and a fourth data segment;
perform the relationship function on the third data segment and the fourth data segment, yielding a third result; and
compare the third result and the first result.

14. The article of claim 10 wherein:
comparing the first result and the second result includes determining whether the similarity between the first result and the second result exceeds a similarity threshold; and
the processor is further caused to perform additional anti-malware processing on the portion of data based on the determining whether the similarity exceeds the similarity threshold.

15. The system of claim 14, wherein comparing the first result and the second result includes determining whether the first result and the second result are equal.

16. The system of claim 14, wherein comparing the first result and the second result includes determining whether the first result and the second result contain one or more repeating patterns in common.

17. The system of claim 14, wherein:
comparing the first result and the second result includes determining whether the similarity between the first result and the second result exceeds a similarity threshold; and
the anti-malware application is further caused to:
select a third data segment and a fourth data segment;
perform the relationship function on the third data segment and the fourth data segment, yielding a third result; and
compare the third result and the first result.

18. The system of claim 14 wherein:
comparing the first result and the second result includes determining whether the similarity between the first result and the second result exceeds a similarity threshold; and
the anti-malware application is further caused to perform additional anti-malware processing on the portion of data based on the determining whether the similarity exceeds the similarity threshold.

19. A non-transitory computer readable storage medium having computer-executable instructions readable by a processor, the instructions, when read and executed, for causing the processor to:
divide a portion of data to be scanned for malware into at least a first data segment and a second data segment;
divide a signature corresponding to an indication of malware into at least a first signature segment and a second signature segment, wherein said signature is not identical to said portion of data;
perform a mathematical relationship function on the first signature segment and the second signature segment, yielding a first result, the relationship function characterizing the relationship between at least two information sets;
perform said relationship function on the first data segment and the second data segment, yielding a second result;
compare the first result and the second result;
based on the comparison, determine that the portion of data includes information corresponding to said signature so as to perform a search of said first two segments of said portion of data for said signature by using said relationship function for detecting malware.

20. The article of claim 10, wherein the relationship function includes a determination of the number of positive bits in each information set.

21. The article of claim 10, wherein the relationship function includes an element-by-element comparison of whether the elements in a first information set are equal to the corresponding element in a second information set.

22. The article of claim 10, wherein the processor is further caused to determine that the portion of data includes malware identified by the signature.

23. The article of claim 10, wherein comparing the first result and the second result includes determining whether the similarity between the first result and the second result exceeds a similarity threshold.

24. The article of claim 23, wherein the processor is further caused to:
select a third signature segment and a fourth signature segment;
perform the relationship function on the third signature segment and the fourth signature segment, yielding a third result; and
compare the third result and the second result.

25. A system for detecting malware, comprising:
a processor;
a non-transitory computer readable medium; and
an anti-malware application configured to protect an electronic device from malware, the anti-malware application including instructions carried on the non-transitory computer readable medium, the instructions readable by a processor, the instructions, when read and executed, for causing the anti-malware application to:
divide a portion of data to be scanned for malware into at least a first data segment and a second data segment;
divide a signature corresponding to an indication of malware into at least a first signature segment and a second signature segment, wherein said signature is not identical to said portion of data;
perform a mathematical relationship function on the first signature segment and the second signature segment, yielding a first result, the relationship function characterizing the relationship between at least two information sets;
perform said relationship function on the first data segment and the second data segment, yielding a second result;
compare the first result and the second result;
based on the comparison, determine that the portion of data includes information corresponding to said signature so as to perform a search of said first two segments of the portion of data for said signature by using said relationship function for the detection of malware.

26. The system of claim 14, wherein the relationship function includes a determination of the number of positive bits in each information set.

27. The system of claim 14, wherein the relationship function includes an element-by-element comparison of whether the elements in a first information set are equal to the corresponding element in a second information set.

28. The system of claim 14, wherein the anti-malware application is further caused to determine that the portion of data includes malware identified by the signature.

29. The system of claim 14, wherein comparing the first result and the second result includes determining whether the similarity between the first result and the second result exceeds a similarity threshold.

30. The article of claim 29, wherein the anti-malware application is further caused to:
select a third signature segment and a fourth signature segment;
perform the relationship function on the third signature segment and the fourth signature segment, yielding a third result; and
compare the third result and the second result.

* * * * *